March 14, 1933.  C. A. WINSLOW ET AL  1,901,484
OIL FILTER
Filed Jan. 27, 1926  2 Sheets-Sheet 1
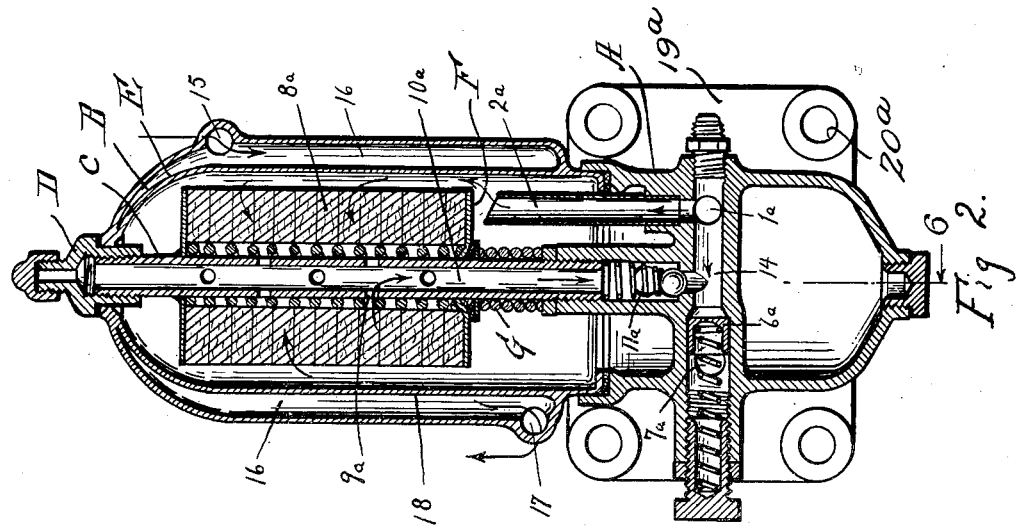
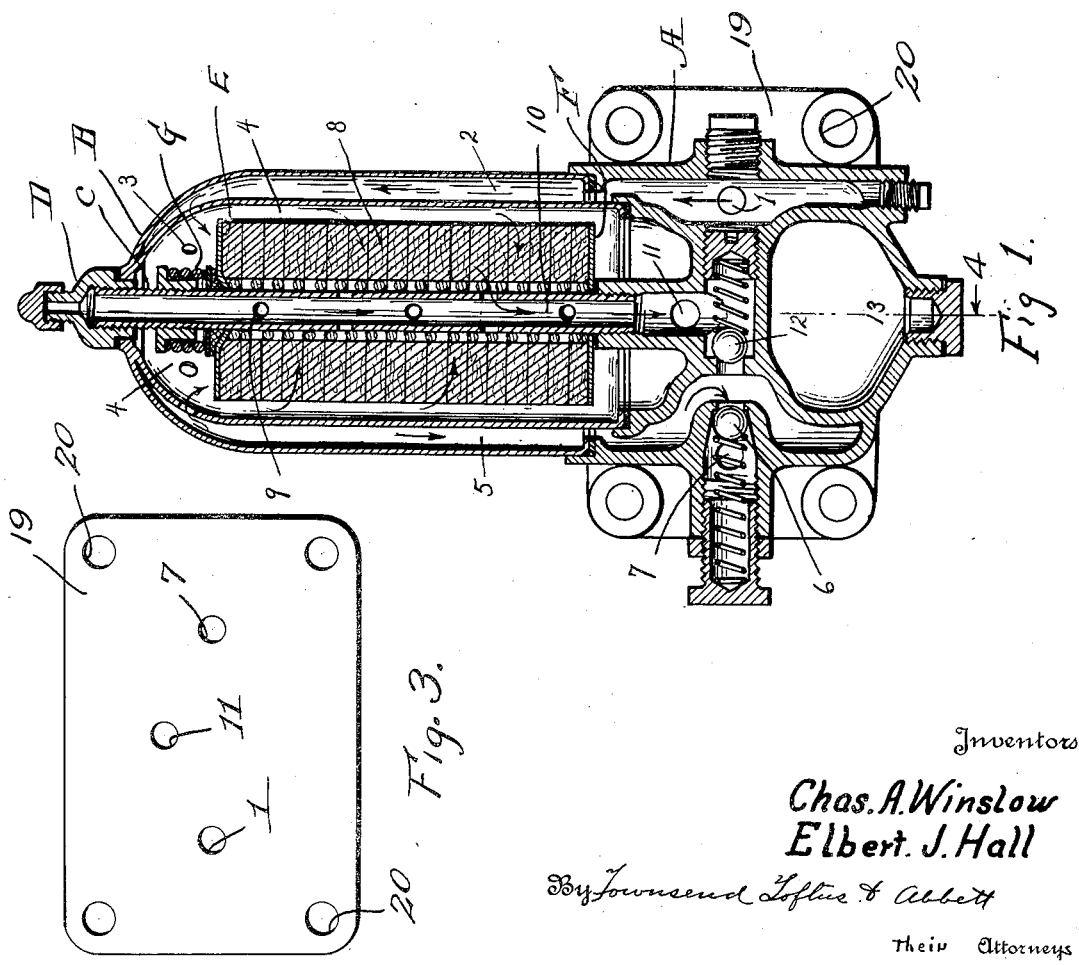
Inventors
Chas. A. Winslow
Elbert. J. Hall
By Townsend Loftus & Abbett
Their Attorneys March 14, 1933. C. A. WINSLOW ET AL 1,901,484
OIL FILTER
Filed Jan. 27, 1926 2 Sheets-Sheet 2
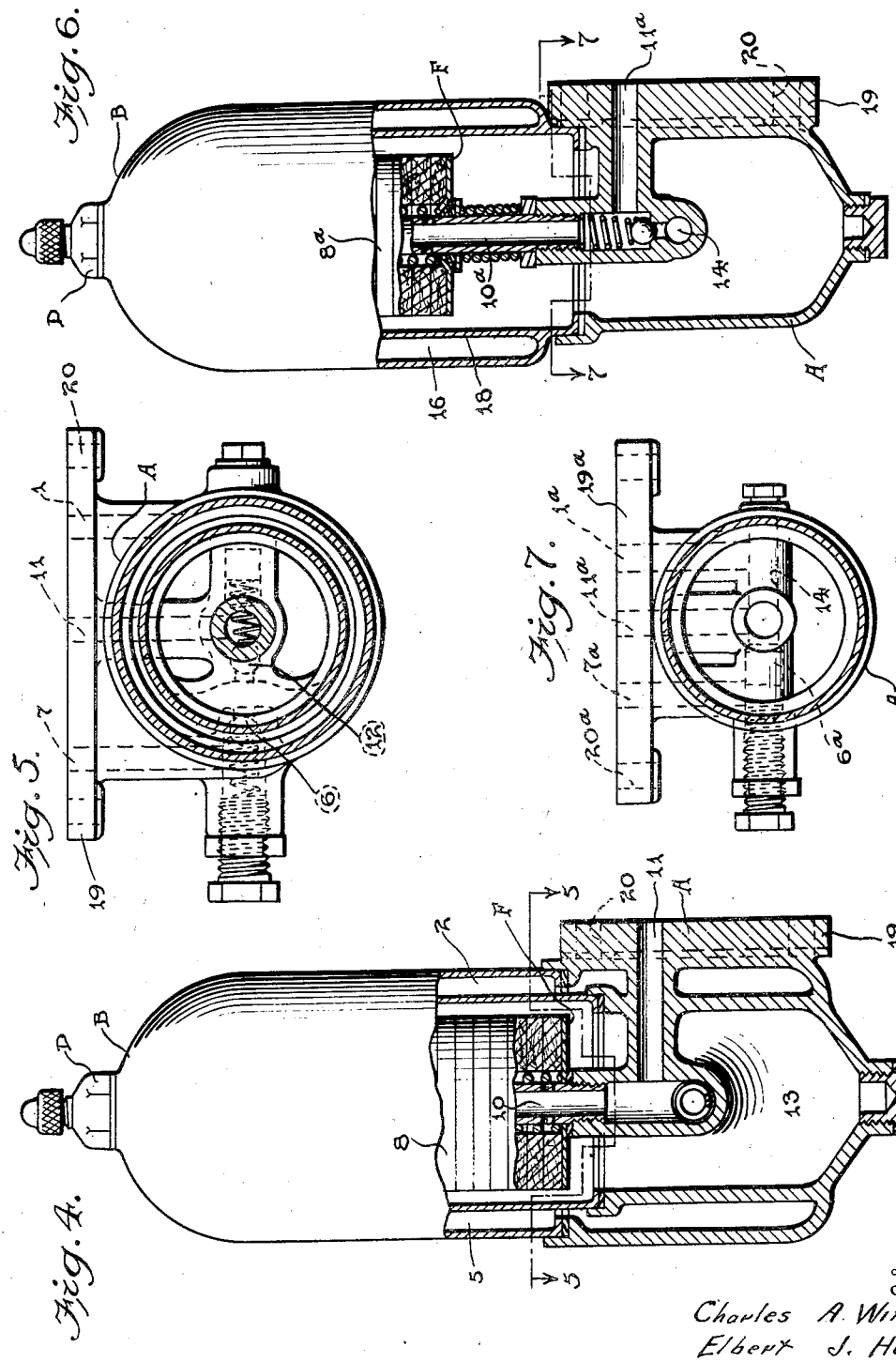
Inventors
Charles A. Winslow
Elbert J. Hall
By Townsend Loftus & Abbott
Their Attorneys Patented Mar. 14, 1933

1,901,484

UNITED STATES PATENT OFFICE

CHARLES A. WINSLOW, OF VALLEJO, AND ELBERT J. HALL, OF BERKELEY, CALIFORNIA

OIL FILTER

Application filed January 27, 1926. Serial No. 84,234.

This invention relates to means for heating the oil or fluid within a filter, the object of the improvements being to utilize some of the heat usually going to wastes in radiation through the radiator, oil pan or exhaust of a hydro-carbon engine.

A further object of the invention is the provision of a filter adapted to be heated with any convenient heat furnishing medium to aid in maintaining the proper temperatures for the filter to function properly in operation.

The invention according to certain aspects thereof relates to certain structural features of the filter and to the arrangement of parts comprised in the filter.

The invention according to other aspects thereof relates to features of construction and a combination of parts particularly useful in an oil filter.

It is clearly understood that we are not limited to the forms shown, which are only examples of the application of the principle of applying heat to the exterior of a filtering device used in combination with the lubricating or fuel system of a hydro-carbon engine.

Two forms of the invention are shown in the accompanying drawings and illustrated in Figures 1 and 2.

Figure 1 is a sectional view of a filter adapted to be jacketed, preferably with lubricating or fuel oil used in combination with a hydro-carbon engine.

Figure 2 is a sectional view showing a filter which form is preferably jacketed with steam, water, exhaust gas or suitable means separate from the lubricating or fuel system.

In each of the sectional views 1 and 2, there clearly appears the front of flange portions on the body or main member of the particular filter illustrated.

Fig. 3 is a rear view of the flange portion of the body and primarily this view shows the oil openings—either oil-receiving or oil-delivery openings—and the bolt-receiving openings or bolt holes therein of the filter shown in Fig. 1. It is also typical of the flange portion of the body of Fig. 2.

Fig. 4 is a vertical view partly in section of the filter shown in Fig. 1. The lower portion of Fig. 4 is in fact a vertical sectional view taken on the plane indicated by the line 4 in Fig. 1, looking in the direction of the arrow.

Fig. 5 is a horizontal sectional view of the filter of Figs. 1 or 4 taken on the planes indicated by the broken line 5—5, looking in the direction of the arrows.

Fig. 6 is a vertical view partly in section of the filter shown in Fig. 2. The lower portion of Fig. 5 is in fact a vertical section taken on the plane indicated by the line 6 of Fig. 2, looking in the direction of the arrow.

Fig. 7 is a horizontal sectional view of the filter of Figs. 2 or 6 taken on the planes indicated by the broken line 7—7, looking in the direction of the arrows.

In Figure 1, the incoming oil to the filter enters through port 1, passes upwardly through jacket space 2, the portion to be filtered passing through ports 3, into the inner filter chamber 4, the surplus oil passing around through space 5, out through pressure regulating valve 6, and returns to crank-case through port 7. The filtered portion passes through the filter medium 8, thence through ports 9, and downwardly through passage 10 and out to engine bearings at port 11.

In the event that the engine bearings require more oil than the filter medium will pass, by pass valve 12 opens at a pre-determined pressure differential, allowing oil to shunt the filter medium and pass directly to the bearings.

Due to the action of these cooperating pressure regulating valves, a low differential is automatically maintained on the filter medium 8, which allows contamination to collect on its outer surface so lightly that it is continuously shed by its own weight into the sump 13, from which it can be readily drained.

The unfiltered portion of the oil in this case passing as stated before through passages 2 and 5 (as indicated by arrows) serves to keep the entire filter at any pre-determined or desirable temperature that may be required for properly filtering oil or other fluid.

In Figure 2 the oil enters at port 1—A, the portion to be filtered passing up through tube 2—A and through filter medium 8—A, thence through ports 9—A and downwardly through passages 10—A, the filtered oil passing out to engine bearings at port 11—A, as indicated by arrows.

The oil delivered to the filter in excess of the engine requirements, passes through passage 14 and out past by pass valve 6—A and port 7—A, returning to its source for recirculation.

The heating medium used in construction shown in Figure 2 is preferably taken in through port 15, passing downwardly in a spiral path through space 16 and out through port 17, transmitting its heat to the filter shell 18 on its passage through the jacket.

We are aware that prior to this invention, oil has been heated during process of filtering, as shown in our patent applications Serial Number 739,958, filed, September 25th, 1924, and Serial Number 739,963, filed September 25th, 1924, but we do claim to show and incorporate novel means for accomplishing and maintaining any predetermined or desirable temperature that may be required for filtering oil or other fluid in filters of this character.

Each filter has a main or body portion with flange portions 19 thereupon provided with openings 20 adapted for receiving any suitable securing means as bolts or studs by which the filter can be secured in place. Each body member is thus sometimes referred to herein as a body having side flange portions at the rear thereof.

From what has preceded, it will be noted:

(A) that the filter comprises a lower or main body member A, an upper removable casing construction or shell member B detachably secured in place on and in respect to the body member by any suitable means such as is provided, for example, by the screw threaded tubular member or rod C, one end of which has a threaded connection to the body member and the other end of which has a threaded portion that receives the holding-on nut D, (B) that the body member A and the shell or casing construction detachably secured thereto provide a receiving space for the filter or filtering medium 8 and that members A and B together provide the casing proper of the filter, (C) that the space 4 within the filter casing; to wit, within the removable casing member B on the one hand and the outer portion of the filtering medium 8 on the other may be referred to as the initial oil-receiving space from which oil to be filtered passes to and through the filtering medium, (D) that the particular filtering medium is shown as being tubular and when assembled in place is arranged so that the axis of the tube extends vertically, (E) that the filtering medium is held in place on the tubular member or rod C between plates E and F, one of which is spring pressed toward the other as by spring means G and that when thus held, the filtering medium and the tubular rod construction therefor—and which tubular rod is provided with openings or ports 9—cooperate in defining or providing a filtered oil-receiving space into which oil from the filtering medium is received, (F) that the body member has the port 1 which may be referred to as the initial oil-inlet opening, the port 11 which may be referred to as the main oil-outlet opening or even as the filtered oil-outlet opening, and the port 7 which may be referred to as the auxiliary oil-outlet opening or even as the surplus oil-outlet opening, (G) that the filter construction provides:

(a) a conduit that may be termed the initial oil-inlet conduit and which extends from the initial oil-inlet opening to said inlet oil-receiving space, at least the initial portion of which conduit is provided in and by said body member, (b) a conduit that may be termed the filtered oil conduit that extends from the filtered oil-receiving space to the main outlet opening, at least the final portion of which conduit is provided in and by said body member, (c) a first valve-controlled bypass conduit or valve-controlled low differential conduit leading in effect directly from the initial oil conduit to the filtered oil conduit, which bypass conduit is provided in and by the body member and is normally closed by valve 12 pressed against its seat by a relatively weak spring that presses the valve toward its seat in opposition to the pressure of the oil in the initial oil conduit, and (d) a second valve-controlled bypass conduit or surplus oil conduit leading in effect directly from the initial oil conduit to the auxiliary outlet opening, which surplus oil conduit is provided in and by the body member and is normally closed by valve 6 pressed against its seat by a spring—stronger than the spring for valve 12—that presses the valve 6 toward its seat in opposition to the pressure of the oil in the initial oil conduit.

(H) that a sump, which is in effect a settling chamber, is provided in and by a cavital portion of the body member and that the sump is located directly below and in communication with the initial oil-receiving space which is around the filtering medium whereby solid particles shed from the filter or gravitating from the oil in the region of the filter can drop and collect within the lower portion of the sump, (I) that the upper portion of the sump in effect is an enlargement in communication with the initial oil conduit at a point where the rate of oil flow is relatively slow, (J) that the bypass conduits are arranged so that when oil is bypassed through either or both of said conduits, it is accomplished without disturbing any of the gravitated solid particles in the sump or even the general conditions within the sump and without disturbing any solid particles built up on or collected near the filtering medium, and (K) that the body member is constructed so as to provide for attachment of the filter to a hydrocarbon engine in a manner whereby heat can be conserved in the oil being filtered.

What we claim as our invention is:—

1. An oil filter for use in connection with pressure feed lubricating systems of internal combustion engines, comprising a removable casing, a filter medium enclosed by said casing, and a one-piece casting forming a base for said casing containing inlet and outlet ports to the filter medium, a sump, a pressure-operated valve between the inlet and outlet ports whereby oil will by-pass said filter medium and said sump when the pressure is exceeded, said base also containing a separate return port for excess oil, and a pressure-operated by-pass between the latter and the inlet port.

2. In an oil filter system for hydrocarbon engines, a base having a flange adapted to be connected directly to a support, a sludge basin formed in the lower portion of said base, an oil inlet in said base, terminating at a point near the top thereof, an oil outlet for said base, a central, vertically disposed tube arranged on said base and communicating with the oil outlet, a filter element surrounding said tube, a casing surrounding said filter element, and by-pass means bettween said inlet and outlet.

3. A filter comprising a body member, having a sump substantially in its lower portion, a casing above the body member which is detachably secured in respect to the body member, a filtering medium within the casing, said body having side flange portions and also provided with inlet and outlet openings into and from which oil to be filtered and filtered oil passes, said flange portions having openings for receiving means for attaching the filter in place.

4. A filter comprising a body member, a shell member detachably secured in respect to the body member, which members constitute the filter casing proper that provides therein a sump, a filtering medium within the casing and extending above the sump, said body member having a flange portion with inlet and outlet openings therethrough into and from which oil to be filtered and filtered oil passes, said flange portion also having openings in the same face with the aforesaid openings for receiving means for attaching the filter in place.

5. A filter comprising a body member, a casing detachably secured in respect to the body member, a filtering medium within the casing, said body member having side flange portions at the rear thereof, said body member also having inlet and outlet openings at the rear thereof into and from which oil to be filtered and filtered oil passes, said body member having openings in the same face with the aforesaid openings for receiving means for attaching the filter in place.

6. A filter comprising a body member, a shell member detachably secured in place in respect to the body member, which members constitute the filter casing proper, said casing proper providing a sump in the lower portion thereof and a normally closed drain opening leading from the sump, said body member having inlet and outlet conduits for the passage of oil into and from the body member, the body member also having a bypass conduit leading from the inlet conduit to the outlet conduit, a valve in said bypass conduit which valve is spring pressed toward closed position against the pressure of the oil in the inlet conduit but movable from closed position when a sufficient differential pressure exists between the inlet and outlet conduits, said body member also having a second bypass conduit leading from the inlet conduit, a pressure-regulating valve in said second bypass conduit, which pressure-regulating valve is spring pressed toward closed position against the pressure of the oil in the inlet conduit but movable from closed position when sufficient pressure exists in said inlet conduit.

7. A filter comprising a body member, having a sump substantially in its lower portion, a casing above the body member which is detachably secured in respect to the body member, a filtering medium within the casing, said body having side flange portions and also provided with inlet and outlet openings into and from which oil to be filtered and filtered oil passes, said flange portions having openings for receiving means for attaching the filter in place, the body member also having a bypass conduit leading from the inlet conduit to the outlet conduit, a valve in said bypass conduit, which valve is spring pressed toward closed position against the pressure of the oil in the inlet conduit but movable from closed position when a sufficient differential pressure exists between the inlet and outlet conduits, said body member also having a second bypass conduit leading from the inlet conduit, a pressure-regulating valve in said second bypass conduit, which pressure-regulating valve is spring pressed toward closed position against the pressure of the oil in the inlet conduit but movable from closed position when sufficient pressure exists in said inlet conduit.

In testimony whereof we affix our signatures.

CHARLES A. WINSLOW.
ELBERT J. HALL.